United States Patent
Tanaka et al.

(10) Patent No.: US 8,895,202 B2
(45) Date of Patent: *Nov. 25, 2014

(54) FUEL CELL MEMBRANE ELECTRODE ASSEMBLY

(71) Applicant: Honda Motor Co., Ltd., Tokyo (JP)

(72) Inventors: Yukihito Tanaka, Saitama (JP); Akihiro Noda, Utsunomiya (JP); Seiji Sugiura, Utsunomiya (JP); Shuji Sato, Utsunomiya (JP); Takaki Nakagawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 13/733,260

(22) Filed: Jan. 3, 2013

(65) Prior Publication Data

US 2013/0183605 A1 Jul. 18, 2013

(30) Foreign Application Priority Data

Jan. 13, 2012 (JP) .................................. 2012-004914
Feb. 8, 2012 (JP) .................................. 2012-024819

(51) Int. Cl.
  *H01M 8/10* (2006.01)
  *H01M 8/02* (2006.01)

(52) U.S. Cl.
  CPC .......... *H01M 8/1004* (2013.01); *H01M 8/0273* (2013.01); *Y02E 60/521* (2013.01)
  USPC ...................................................... 429/481

(58) Field of Classification Search
  USPC .......................... 429/434, 457, 480, 481, 483
  See application file for complete search history.

(56) References Cited

U.S. PATENT DOCUMENTS

| | | | | |
|---|---|---|---|---|
| 8,524,416 B2 * | 9/2013 | Ishida et al. | ................. | 429/508 |
| 8,551,671 B2 * | 10/2013 | Ishikawa et al. | .............. | 429/508 |
| 8,685,588 B2 * | 4/2014 | Yamada et al. | ................ | 429/480 |
| 2005/0058870 A1 | 3/2005 | Healy et al. | | |
| 2009/0004539 A1 * | 1/2009 | Ishikawa et al. | ................. | 429/35 |
| 2009/0291350 A1 * | 11/2009 | Ishida et al. | ..................... | 429/34 |
| 2010/0047649 A1 * | 2/2010 | Yamada et al. | ................. | 429/30 |
| 2010/0297525 A1 * | 11/2010 | Fukuta et al. | ................. | 429/483 |
| 2011/0136038 A1 * | 6/2011 | Ishida et al. | ................. | 429/480 |
| 2012/0258379 A1 * | 10/2012 | Fukuta et al. | ................. | 429/457 |
| 2013/0101916 A1 * | 4/2013 | Sugiura et al. | ................ | 429/480 |
| 2013/0157175 A1 * | 6/2013 | Sohma et al. | ................. | 429/535 |
| 2013/0183604 A1 * | 7/2013 | Tanaka et al. | ................. | 429/480 |

FOREIGN PATENT DOCUMENTS

| | | |
|---|---|---|
| JP | 3052536 B2 | 6/2000 |
| JP | 3368907 B2 | 1/2003 |
| JP | 2007-066766 A | 3/2007 |
| JP | 2009-099265 A | 5/2009 |
| JP | 4566995 B2 | 10/2010 |

* cited by examiner

*Primary Examiner* — Stewart Fraser

(74) *Attorney, Agent, or Firm* — Carrier Blackman & Associates, P.C.; William D. Blackman; Joseph P. Carrier

(57) ABSTRACT

A resin frame equipped membrane electrode assembly includes a membrane electrode assembly and a resin frame member. The membrane electrode assembly includes a solid polymer electrolyte membrane and an anode, and a cathode sandwiching the solid polymer electrolyte membrane. The resin frame member is formed around the solid polymer electrolyte membrane. The outer end of an electrode catalyst layer of the cathode protrudes beyond the outer end of a gas diffusion layer, and the resin frame member includes an inner extension protruding toward the outer periphery of the cathode to contact the outer end of the solid polymer electrolyte membrane. The inner extension of the resin frame member has an overlapped portion overlapped with the outer end of the electrode catalyst layer.

5 Claims, 16 Drawing Sheets

FUEL CELL MEMBRANE ELECTRODE ASSEMBLY

CROSS-REFERENCE TO RELATED APPLICATIONS

This application is based upon and claims the benefit of priority from Japanese Patent Applications No. 2012-004914 filed on Jan. 13, 2012 and No. 2012-024819 filed on Feb. 8, 2012, the contents all of which are incorporated herein by reference.

BACKGROUND OF THE INVENTION

1. Field of the Invention

The present invention relates to a fuel cell membrane electrode assembly including an anode, a cathode, and a solid polymer electrolyte membrane interposed between the anode and the cathode.

2. Description of the Related Art

In general, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode to form a membrane electrode assembly (MEA). Each of the anode and the cathode includes electrode catalyst as an electrode catalyst layer and porous carbon as a gas diffusion layer. The membrane electrode assembly is sandwiched between separators (bipolar plates) to form a fuel cell. In use of the fuel cell, generally, a predetermined number of power generation cells are stacked together to form a fuel cell stack, e.g., mounted in a vehicle.

In some cases, in the membrane electrode assembly, the surface size of one of electrodes (catalyst layer and diffusion layer) is smaller than the surface size of the solid polymer electrolyte membrane, and the surface size of the other electrode is the same as the surface size of the solid polymer electrolyte membrane, e.g., as a stepped-type MEA.

For example, in Japanese Laid-Open Patent Publication No. 2009-099265 (hereinafter referred to as conventional technique), as shown in FIG. 16, an anode 2 and a cathode 3 are provided on both surfaces of a solid polymer electrolyte membrane 1. Gas seals 4a, 4b are provided around the anode 2 and the cathode 3. The anode 2 and the cathode 3 are sandwiched between separators 5, 6.

The anode 2 includes an anode catalyst layer 2a provided on one surface of the solid polymer electrolyte membrane 1 and an electrode base member (diffusion layer) 2b provided outside the anode catalyst layer 2a. The cathode 3 includes a cathode catalyst layer 3a provided on the other surface of the solid polymer electrolyte membrane 1 and an electrode base member (diffusion layer) 3b provided outside the cathode catalyst layer 3a.

The outer shape of the anode catalyst layer 2a and the outer shape of the electrode base member 2b have the same size, and the outer shape of the cathode catalyst layer 3a and the outer shape of the electrode base member 3b have the same shape. Further, the outer shape of the anode 2 is larger than the outer shape of the cathode 3.

A fuel gas flow field 5a for supplying a fuel gas to the anode 2 is formed in the separator 5, and an oxygen-containing gas flow field 6a for supplying an oxygen-containing gas to the cathode 3 is formed in the separator 6.

SUMMARY OF THE INVENTION

In the conventional technique, the outer shape of the cathode 3 is smaller than the outer shape of the anode 2. The solid polymer electrolyte membrane 1 includes a half electrode portion 7 where the electrode is provided only on one side. At the cathode 3, a gap S is formed between the outer end of the cathode 3 and the inner end of the gas seal 4b because of the presence of tolerance of machining precision, molding precision or the like. In the structure, some of the oxygen-containing gas supplied to the oxygen-containing gas flow field 6a may permeate through the electrode base member 3b made of porous material, and may enter the half electrode portion 7 through the gap S.

Thus, in the half electrode portion 7, reaction of the hydrogen which permeated through the solid polymer electrolyte membrane 1 and oxygen in the oxygen-containing gas which entered the half electrode portion 7 is induced, and hydrogen peroxide ($H_2O_2$) tends to be generated easily ($H_2 + O_2 \rightarrow H_2O_2$). This hydrogen peroxide is decomposed on carbon carriers and platinum (Pt) in the electrode, and for example, active substances such as hydroxyl radical (.OH) are generated. As a result, the solid polymer electrolyte membrane 1 and the electrode are degraded disadvantageously.

Further, at the anode 2, the fuel gas flow field 5a is not provided in the separator 5 facing the half electrode portion 7 in the stacking direction, and thus the half electrode portion 7 is closed. Therefore, the oxygen-containing gas which entered the half electrode portion 7 is retained in this half electrode portion 7, and the above degradation reaction occurs easily.

The present invention has been made to solve the problems of this type, and an object of the present invention is to provide a fuel cell membrane electrode assembly which makes it possible to prevent entry of the reactant gas into an end of the solid polymer electrolyte membrane, and effectively suppress degradation at the end of the solid polymer electrolyte membrane.

The present invention relates to a fuel cell membrane electrode assembly including a membrane electrode assembly and a resin frame member. The membrane electrode assembly includes a solid polymer electrolyte membrane, an anode provided on one surface of the solid polymer electrolyte membrane, and a cathode provided on another surface of the solid polymer electrolyte membrane. The anode has an anode catalyst layer and an anode diffusion layer. The cathode has a cathode catalyst layer and a cathode diffusion layer. An outer end of the anode catalyst layer protrudes outward beyond an outer end of the cathode catalyst layer. The resin frame member is provided around the solid polymer electrolyte membrane.

In the fuel cell membrane electrode assembly, the outer end of the cathode catalyst layer protrudes outward beyond an outer end of the cathode diffusion layer, the resin frame member includes an inner extension protruding toward an outer periphery of the cathode to contact an outer end of the solid polymer electrolyte membrane, the inner extension has an overlapped portion overlapped with the outer end of the cathode catalyst layer.

Further, the invention relates to a fuel cell membrane electrode assembly including a solid polymer electrolyte membrane, an anode provided on one surface of the solid polymer electrolyte membrane, and a cathode provided on another surface of the solid polymer electrolyte membrane. The anode includes an anode catalyst layer and an anode diffusion layer having a surface size larger than that of the anode catalyst layer. The cathode includes a cathode catalyst layer and a cathode diffusion layer having a surface size larger than that of the cathode catalyst layer. The anode catalyst layer and the cathode catalyst layer having different surface sizes.

In the fuel cell membrane electrode assembly, a frame shaped reactant gas non-permeable area is provided between the solid polymer electrolyte membrane and the cathode diffusion layer or the anode diffusion layer, and the frame shaped reactant gas non-permeable area has an overlapped portion overlapped with an outer end of the cathode catalyst layer or the anode catalyst layer. A reactant gas permeable area is provided at the diffusion layer of the counter electrode (anode or cathode) opposite to the electrode where the non-permeable area is provided, around the catalyst layer of the counter electrode.

In the present invention, the outer end of the cathode catalyst layer protrudes outward beyond the outer end of the cathode diffusion layer, and the inner extension of the resin frame member has the overlapped portion overlapped with the outer end of the cathode catalyst layer. In the structure, even if a gap is formed between the outer end of the cathode diffusion layer and the inner extension of the resin frame member, and the oxygen-containing gas permeates though the gap, the oxygen-containing gas from the gap does not contact the half electrode portion of the solid polymer electrolyte membrane. Thus, degradation at the end of the solid polymer electrolyte membrane due to reaction of the oxygen-containing gas and the fuel gas is effectively and reliably suppressed.

Further, in the present invention, a frame shaped reactant gas non-permeable area having an overlapped area overlapped with the outer end of the cathode catalyst layer or the anode catalyst layer. In the structure, the reactant gas from the cathode or the anode does not contact the solid polymer electrolyte membrane. Further, at the diffusion layer of the counter electrode opposite to the electrode where the reactant gas non-permeable area is provided, a reactant gas permeable area is provided around the catalyst layer of the counter electrode. In the structure, the reactant gas is not retained at the counter electrode, and the reactant gas is discharged smoothly and reliably.

Thus, it becomes possible to effectively and reliably suppress degradation at the end of the solid polymer electrolyte membrane due to substance which is produced by reaction of the oxygen-containing gas and the fuel gas and which causes degradation easily.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
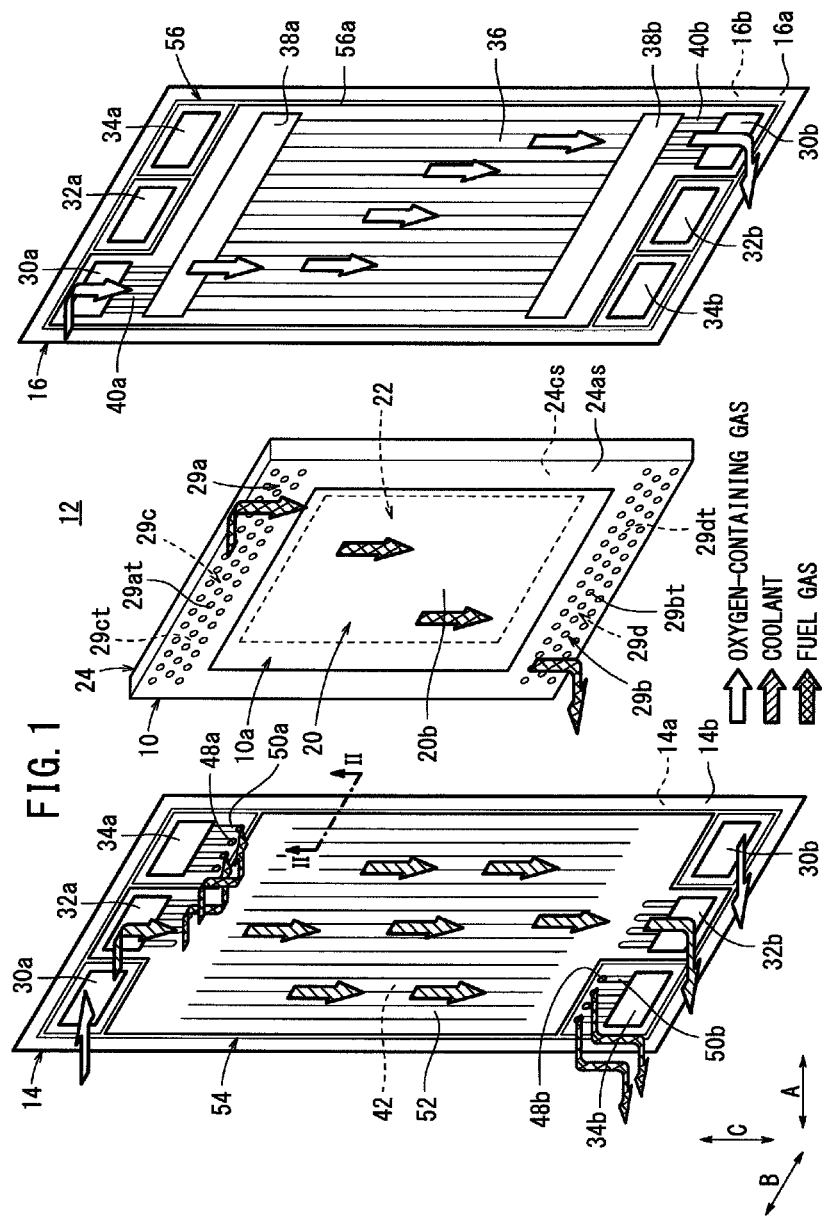
FIG. 1 is an exploded perspective view showing main components of a solid polymer electrolyte fuel cell including a resin frame equipped membrane electrode assembly according to a first embodiment of the present invention.
Figure 2:
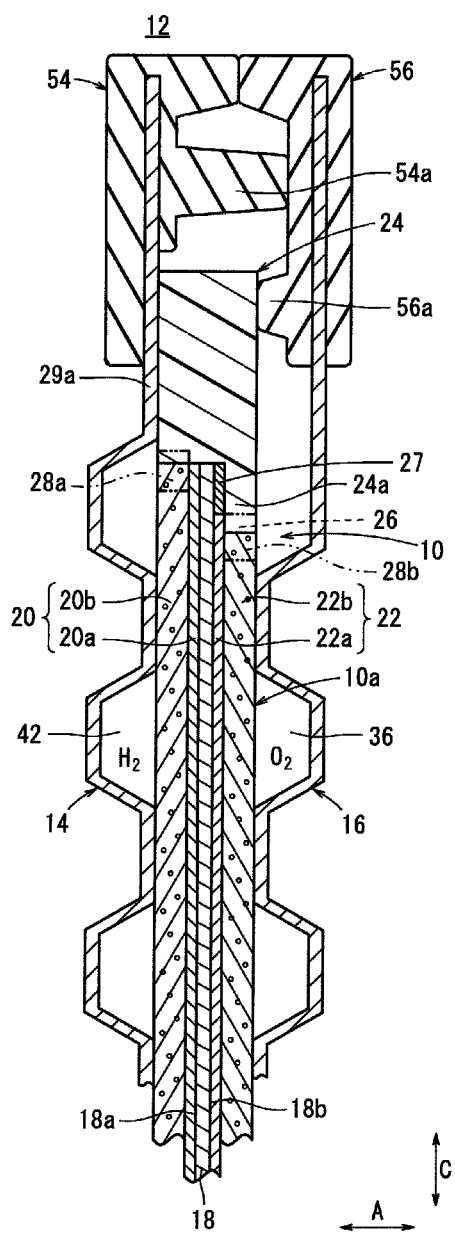
FIG. 2 is a cross sectional view showing the fuel cell, taken along a line II-II in FIG. 1.

As shown in FIGS. 1 and 2, a resin frame equipped membrane electrode assembly 10 according to a first embodiment of the present invention is included in a rectangular solid polymer electrolyte fuel cell 12, and a plurality of the fuel cells 12 are stacked together in a direction indicated by an arrow A to form a fuel cell stack.

In the fuel cell 12, the resin frame equipped membrane electrode assembly 10 is sandwiched between a first separator 14 and a second separator 16. Each of the first separator 14 and the second separator 16 has a rectangular shape elongated in a longitudinal direction. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

Figure 3:
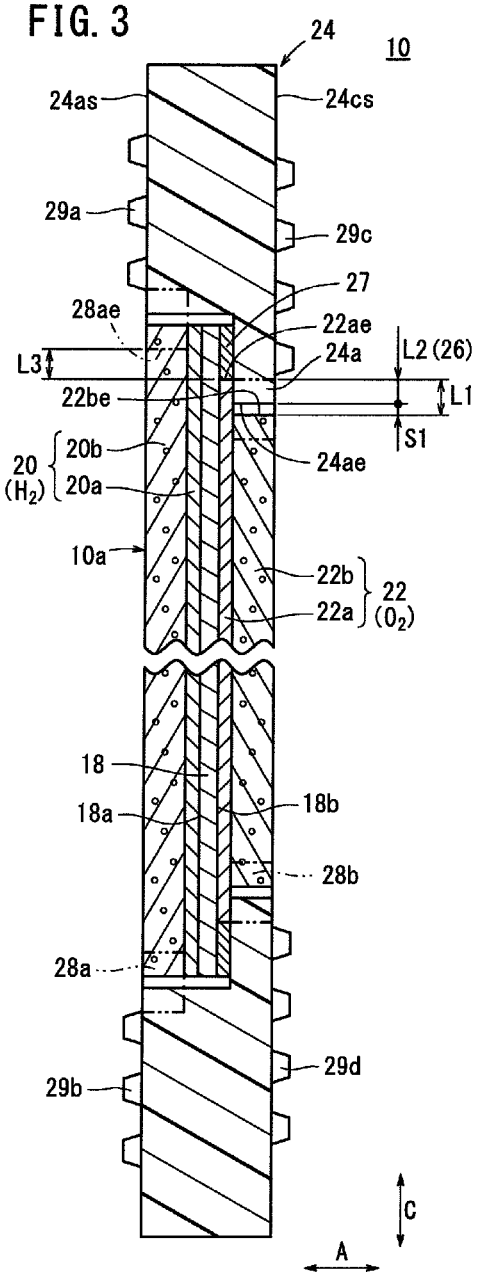
FIG. 3 is a cross sectional view showing main components of the resin frame equipped membrane electrode assembly.

As shown in FIGS. 2 and 3, the resin frame equipped rectangular membrane electrode assembly 10 includes a membrane electrode assembly 10a. Each membrane electrode assembly 10a includes an anode 20, and a cathode 22, and a solid polymer electrolyte membrane 18 interposed between the anode 20 and the cathode 22. For example, the solid polymer electrolyte membrane 18 is formed by impregnating a thin membrane of perfluorosulfonic acid with water. A fluorine based electrolyte may be used as the solid polymer electrolyte membrane 18. Alternatively, an HC (hydrocarbon) based electrolyte may be used as the solid polymer electrolyte membrane 18. The surface size of the cathode 22 is smaller than the surface size of the solid polymer electrolyte membrane 18 and the surface size of the anode 20.

The anode 20 includes an electrode catalyst layer (anode catalyst layer) 20a joined to one surface 18a of the solid polymer electrolyte membrane 18 and a gas diffusion layer (anode diffusion layer) 20b stacked on the electrode catalyst layer 20a. The outer shape of the electrode catalyst layer 20a and the outer shape of the gas diffusion layer 20b have the same size. The outer shape of the electrode catalyst layer 20a and the outer shape of the gas diffusion layer 20b are the same as (or smaller than) the outer shape of the solid polymer electrolyte membrane 18.

The cathode 22 includes an electrode catalyst layer (cathode catalyst layer) 22a joined to a surface 18b of the solid polymer electrolyte membrane 18, and a gas diffusion layer (cathode diffusion layer) 22b stacked on the electrode catalyst layer 22a. As shown in FIG. 3, an outer end 22ae of the electrode catalyst layer 22a protrudes outward (in the direction indicated by the arrow C) beyond an outer end 22be of the gas diffusion layer 22b over the entire periphery by the length L1. The outer shape of the electrode catalyst layer 22a is smaller than the outer shape of the solid polymer electrolyte membrane 18.

Each of the electrode catalyst layers 20a, 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied, or transferred on both surfaces of the solid polymer electrolyte membrane 18 to form the electrode catalyst layers 20a, 22a. For example, each of the gas diffusion layers 20b, 22b comprises a carbon paper or a carbon cloth. The surface size of the gas diffusion layer 22b is smaller than the surface size of the gas diffusion layer 20b. Each of the electrode catalyst layer 20a, 22a may comprise a plurality of layers.

As shown in FIGS. 1 to 4, the resin frame equipped membrane electrode assembly 10 is formed around the outer end of the solid polymer electrolyte membrane 18, and includes a resin frame member 24 joined to the anode 20 and the cathode 22. For example, the resin frame member 24 is made of PPS (Poly Phenylene Sulfide Resin), PPA (polyphthalamide), PEN (polyethylene naphthalate), PES (polyethersulfone), LCP (liquid crystal polymer), PVDF (polyvinylidene fluoride), a silicone rubber, a fluororubber, or an EPDM (ethylene propylene diene monomer) rubber.

The resin frame member 24 has an inner extension 24a protruding toward the outer periphery of the cathode 22 to contact the outer end of the solid polymer electrolyte membrane 18. The inner extension 24a has the same thickness as the cathode 22. In effect, the inner extension 24a has the same thickness as the gas diffusion layer 22b. A gap S1 is formed between an inner end 24ae of the inner extension 24a and the outer end 22be of the gas diffusion layer 22b (see FIG. 3).

The inner extension 24a of the resin frame member 24 includes an overlapped portion 26 overlapped with the outer end of the electrode catalyst layer 22a in the stacking direction indicated by the arrow A. In the overlapped portion 26, the outer end 22ae of the electrode catalyst layer 22a and the inner end 24ae of the inner extension 24a are overlapped over the length L2.

The inner extension 24a of the resin frame member 24 is adhered to the outer end of the solid polymer electrolyte membrane 18 and the outer end of the electrode catalyst layer 22a by an adhesive layer 27. For example, ester based or urethane based hot melt adhesive is used for the adhesive layer 27. The resin frame member 24 and the gas diffusion layer 20b of the anode 20 are combined together by a resin impregnated portion 28a, and the resin frame member 24 and the gas diffusion layer 22b of the cathode 22 are combined together by a resin impregnated portion 28b.

The adhesive layer 27 is formed in a frame shape over the entire periphery of the outer end of the solid polymer electrolyte membrane 18. The resin impregnated portion 28a is formed in a frame shape over the entire periphery of the gas diffusion layer 20b, and the resin impregnated portion 28b is formed in a frame shape over the entire periphery of the gas diffusion layer 22b of the cathode 22. An inner end 28ae of the resin impregnated portion 28a is spaced outward from the outer end of the overlapped portion 26 overlapped in the stacking direction, by the distance L3 (see FIG. 3).

As shown in FIG. 1, an inlet buffer 29a corresponding to the inlet side of a fuel gas flow field 42 as described later is provided at an upper end in a surface 24as of the resin frame member 24 facing the anode 20. An outlet buffer 29b corresponding to the outlet side of the fuel gas flow field 42 is provided at a lower end in the surface 24as of the resin frame member 24. The inlet buffer 29a and the outlet buffer 29b are formed by a plurality of protrusions 29at, 29bt, respectively.

Figure 4:
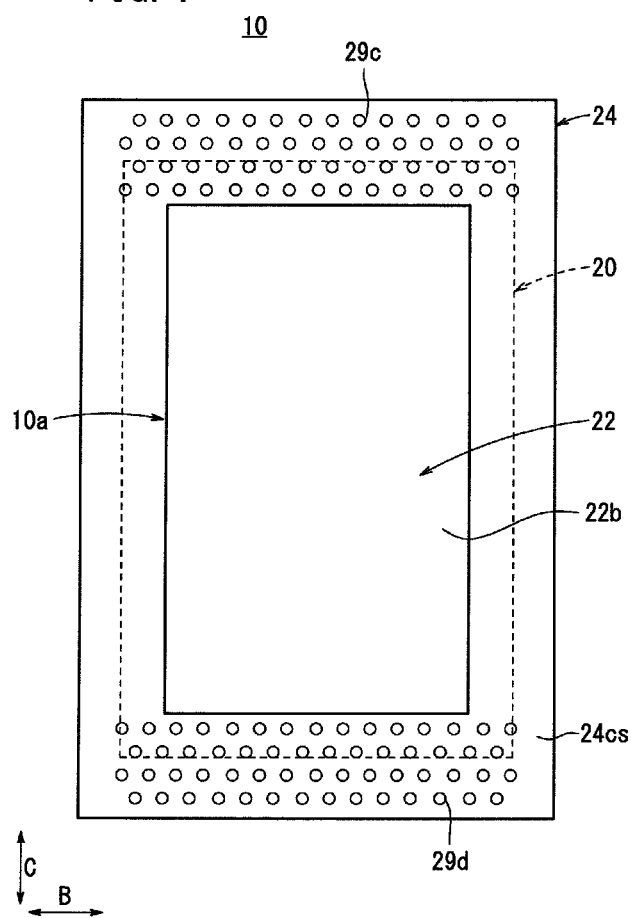
FIG. 4 is a view showing one surface of the resin frame equipped membrane electrode assembly.

As shown in FIG. 4, an inlet buffer 29c corresponding to the inlet side of an oxygen-containing gas flow field 36 (described later) is provided at an upper end in a surface 24cs of the resin frame member 24 facing the cathode 22. An outlet buffer 29d corresponding to the outlet side of the oxygen-containing gas flow field 36 is provided at a lower end in the surface 24cs of the resin frame member 24. The inlet buffer 29c and the outlet buffer 29d are formed by a plurality of protrusions 29ct, 29dt, respectively.

As shown in FIG. 1, at an upper end of the fuel cell 12 in a direction indicated by an arrow C (direction of gravity in FIG. 1), an oxygen-containing gas supply passage 30a for supplying an oxygen-containing gas, a coolant supply passage 32a for supplying a coolant, and a fuel gas supply passage 34a for supplying a fuel gas such as a hydrogen-containing gas are arranged in a horizontal direction indicated by an arrow B. The oxygen-containing gas supply passage 30a, the coolant supply passage 32a, and the fuel gas supply passage 34a extend through the fuel cell 12 in the stacking direction indicated by the arrow A.

At a lower end of the fuel cell 12 in the direction indicated by the arrow C, a fuel gas discharge passage 34b for discharging the fuel gas, a coolant discharge passage 32b for discharging the coolant, and an oxygen-containing gas discharge passage 30b for discharging the oxygen-containing gas are arranged in the direction indicated by the arrow B. The fuel gas discharge passage 34b, the coolant discharge passage 32b, and the oxygen-containing gas discharge passage 30b extend through the fuel cell 12 in the direction indicated by the arrow A.

The second separator 16 has the oxygen-containing gas flow field 36 on its surface 16a facing the resin frame equipped membrane electrode assembly 10. The oxygen-containing gas flow field 36 is connected to the oxygen-containing gas supply passage 30a and the oxygen-containing gas discharge passage 30b. A buffer area 38a is provided at the inlet (upper end) in the oxygen-containing gas flow field 36. The buffer area 38a contacts the inlet buffer 29c provided at the upper end of the surface 24cs of the resin frame member 24. The buffer area 38a has a substantially flat surface. A plurality of inlet connection channels 40a extending from the oxygen-containing gas supply passage 30a are connected to one upper end of the buffer area 38a.

A buffer area 38b is provided at the outlet (lower end) of the oxygen-containing gas flow field 36. The buffer area 38b contacts the outlet buffer 29d provided at the lower end in the surface 24cs of the resin frame member 24. A plurality of outlet connection channels 40b extending from the oxygen-containing gas discharge passage 30b are connected to one end of the buffer area 38b.

Figure 5:
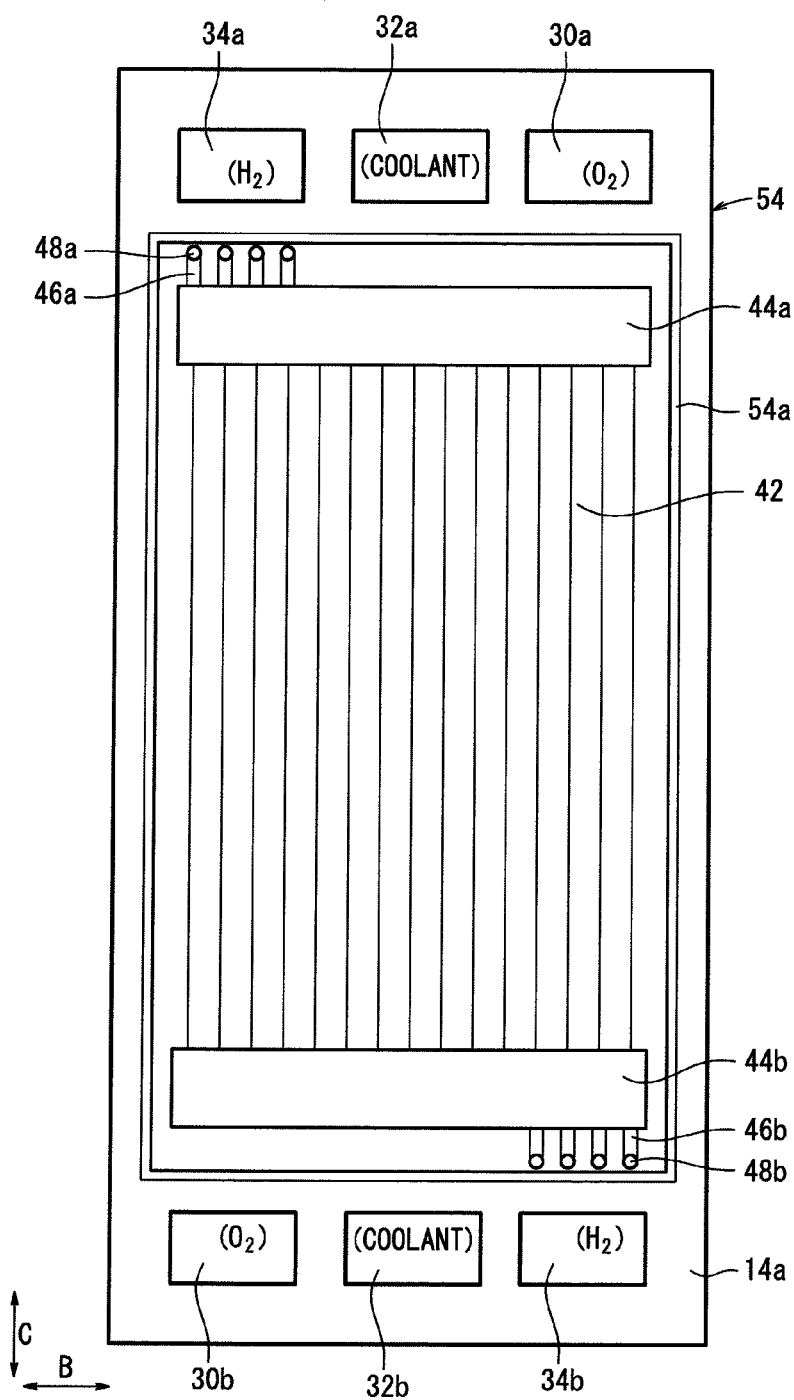
FIG. 5 is a front view showing a first separator of the fuel cell.

As shown in FIG. 5, the first separator 14 has the fuel gas flow field 42 on its surface 14a facing the resin frame equipped membrane electrode assembly 10. The fuel gas flow field 42 extends in the direction indicated by the arrow C.

A buffer area 44a is provided at the inlet (upper end) of the fuel gas flow field 42. The buffer area 44a contacts the inlet buffer 29a provided at the upper end in the surface 24as of the resin frame member 24. A plurality of inlet connection channels 46a are connected to an end of the buffer area 44a adjacent to the fuel gas supply passage 34a, and the inlet connection channels 46a are connected to a plurality of supply holes 48a.

A buffer area 44b is provided at the outlet (lower end) of the fuel gas flow field 42. The buffer area 44b contacts the outlet buffer 29b provided at the lower end in the surface 24as of the resin frame member 24. Discharge holes 48b are connected to an end of the buffer area 44b adjacent to the fuel gas discharge passage 34b through a plurality of outlet connection channels 46b.

As shown in FIG. 1, a plurality of inlet connection channels 50a connecting the supply holes 48a and the fuel gas supply passage 34a and a plurality of outlet connection channels 50b connecting the discharge holes 48b and the fuel gas discharge passage 34b are provided on a surface 14b of the first separator 14. Further, a coolant flow field 52 connecting the coolant supply passage 32a and the coolant discharge passage 32b are provided on the surface 14b of the first separator 14. The coolant flow field 52 extends in the direction indicated by the arrow C.

As shown in FIG. 2, an area of the gas diffusion layer 20b overlapped with the overlapped portion 26 in the stacking direction faces the fuel gas flow field 42.

As shown in FIGS. 1 and 2, a first seal member 54 is formed integrally with the surfaces 14a, 14b of the first separator 14, around the outer end of the first separator 14. A second seal member 56 is formed integrally with the surfaces 16a, 16b of the second separator 16, around the outer end of the second separator 16.

As shown in FIG. 2, the first seal member 54 includes a ridge seal 54a which contacts the second seal member 56, and the second seal member 56 includes a ridge seal 56a which contacts the resin frame member 24 of the resin frame equipped membrane electrode assembly 10. Each of the first seal member 54 and the second seal member 56 includes a thin planar seal provided along the separator surface.

Each of the first seal member 54 and the second seal members 56 is an elastic seal member made of seal material, cushion material, or packing material such as an EPDM (ethylene propylene diene monomer) rubber, an NBR (nitrile butadiene rubber), a fluororubber, a silicone rubber, a fluorosilicone rubber, a Butyl rubber, a natural rubber, a styrene rubber, a chloroprene rubber, or an acrylic rubber.

Next, a method of producing the resin frame equipped membrane electrode assembly 10 will be described below.

Figure 6:
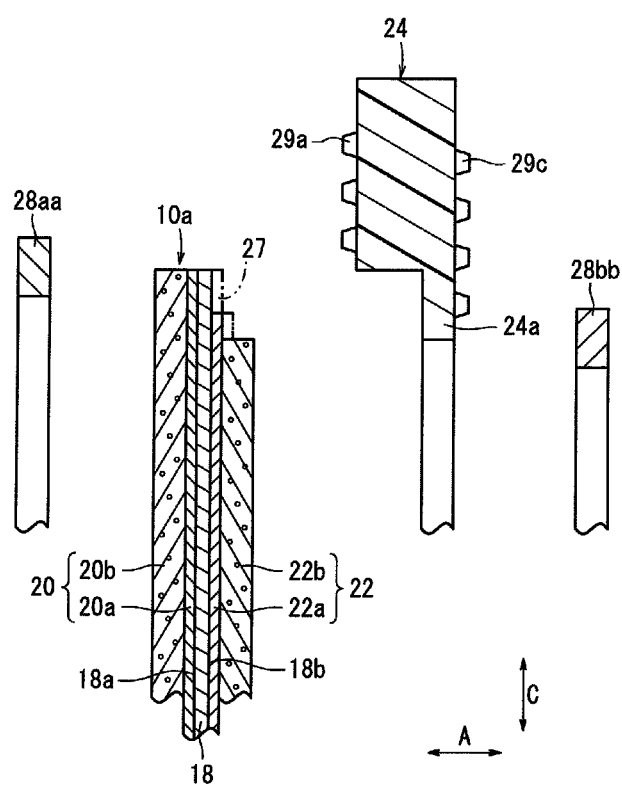
FIG. 6 is a cross sectional view showing a method of producing a resin frame equipped membrane electrode assembly.
Figure 7:
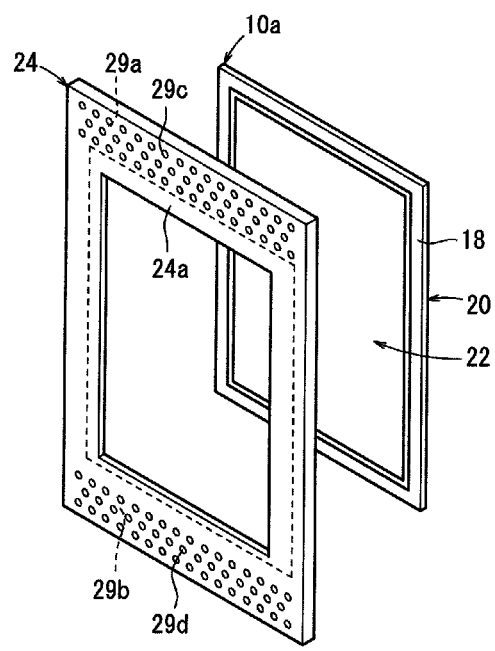
FIG. 7 is a perspective view showing a method of producing a resin frame equipped membrane electrode assembly.

Firstly, as shown in FIGS. 6 and 7, the membrane electrode assembly 10a of a stepped-type MEA is fabricated. Specifically, coating of the electrode catalyst layers 20a, 22a is applied to both surfaces 18a, 18b of the solid polymer electrolyte membrane 18. The gas diffusion layer 20b is provided above the surface 18a of the solid polymer electrolyte membrane 18, i.e., on the electrode catalyst layer 20a, and the gas diffusion layer 22b is provided above the surface 18b of the solid polymer electrolyte membrane 18, i.e., on the electrode catalyst layer 22a. These components are stacked together, and subjected to a hot pressing process to fabricate the membrane electrode assembly 10a.

The resin frame member 24 is formed by an injection molding machine (not shown) beforehand. As shown in FIG. 7, the resin frame member 24 is formed in a frame shape, and the resin frame member 24 includes the thin inner extension 24a. A plurality of protrusions are formed on both surfaces of the resin frame member 24 and at both ends in the longitudinal direction to provide the inlet buffers 29a, 29c, and the outlet buffers 29b, 29d.

Then, as shown in FIG. 6, in the membrane electrode assembly 10a, the adhesive layer 27 is provided at each of the outer end of the solid polymer electrolyte membrane 18 and the outer end of the electrode catalyst layer 22a exposed to the outside from the outer periphery of the cathode 22. The resin frame member 24 is positionally aligned with the membrane electrode assembly 10a.

The inner extension 24a of the resin frame member 24 is provided at the cathode 22, the adhesive layer 27 is melted by heating (subjected to the hot melting process), and a load (e.g., pressure) is applied to the resin frame member 24. Thus, the inner extension 24a of the resin frame member 24 is adhered to the solid polymer electrolyte membrane 18.

Further, at the anode 20, a resin member 28aa for forming the resin impregnated portion 28a is provided, and at the cathode 22, a resin member 28bb for forming the resin impregnated portion 28b is provided. Each of the resin members 28aa, 28bb has a frame shape, and is made of the same material as the resin frame member 24, for example. The resin members 28aa, 28bb may be formed integrally with the resin frame member 24 in advance.

In the state where the resin members 28aa, 28bb are provided in the membrane electrode assembly 10a and the resin frame member 24, and a load is applied to the resin members 28aa, 28bb, the resin members 28aa, 28bb are heated. As a heating method, for example, laser welding, infrared-ray welding, impulse welding or the like is adopted.

Thus, the resin members 28aa, 28bb are melted by heat, and the gas diffusion layer 20b of the anode 20 and the resin frame member 24 are impregnated with the melted resin of the resin member 28aa. Further, the gas diffusion layer 22b of the cathode 22 and the resin frame member 24 are impregnated with the melted resin of the resin member 28bb. In this manner, the resin frame equipped membrane electrode assembly 10 is produced.

The resin frame equipped membrane electrode assembly 10 is sandwiched between the first separator 14 and the second separator 16 to form the fuel cell 12. A predetermined number of the fuel cells 12 are stacked together to form a fuel cell stack, and a tightening load is applied to components between end plates (not shown).

Operation of the fuel cell 12 will be described below.

Firstly, as shown in FIG. 1, an oxygen-containing gas is supplied to the oxygen-containing gas supply passage 30a, and a fuel gas such as a hydrogen containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a into the oxygen-containing gas flow field 36 of the second separator 16. The oxygen-containing gas moves in the direction indicated by the arrow C, and the oxygen-containing gas is supplied to the cathode 22 of the membrane electrode assembly 10a for inducing an electrochemical reaction at the cathode 22. In the meanwhile, the fuel gas from the fuel gas supply passage 34a flows through the supply holes 48a into the fuel gas flow field 42 of the first separator 14. The fuel gas moves in the direction indicated by the arrow C along the fuel gas flow field 42, and the fuel gas is supplied to the anode 20 of the membrane electrode assembly 10a for inducing an electrochemical reaction at the anode 20.

Thus, in each of the membrane electrode assemblies 10a, the oxygen-containing gas supplied to the cathode 22, and the fuel gas supplied to the anode 20 are partially consumed in the electrochemical reactions at catalyst layers of the cathode 22 and the anode 20 for generating electricity.

Then, the oxygen-containing gas partially consumed at the cathode 22 is discharged along the oxygen-containing gas discharge passage 30b in the direction indicated by the arrow A. Likewise, the fuel gas partially consumed at the anode 20 flows through the discharge holes 48b, and the fuel gas is discharged along the fuel gas discharge passage 34b in the direction indicated by the arrow A.

Further, the coolant supplied to the coolant supply passage 32a flows into the coolant flow field 52 between the first separator 14 and the second separator 16, and then, flows in the direction indicated by the arrow C. After the coolant cools the membrane electrode assembly 10a, the coolant is discharged from the coolant discharge passage 32b.

In the first embodiment, as shown in FIGS. 2 and 3, the outer end 22ae of the electrode catalyst layer 22a of the cathode 22 protrudes outward beyond the outer end 22be of the gas diffusion layer 22b, and the inner extension 24a of the resin frame member 24 includes an overlapped portion 26 overlapped with the outer end 22ae of the electrode catalyst layer 22a in the stacking direction.

In the structure, even if the gap S1 is formed between the outer end 22be of the gas diffusion layer 22b and the inner end 24ae of the inner extension 24a of the resin frame member 24 (see FIG. 3), the oxygen-containing gas does not contact the solid polymer electrolyte membrane 18 through the gap S1. Therefore, degradation at the end of the solid polymer electrolyte membrane 18 due to degradation by hydrogen peroxide produced by reaction of the oxygen-containing gas and the fuel gas or hydroxyl radical (.OH) produced using this hydrogen peroxide as a precursor is effectively and reliably suppressed.

Further, in the first embodiment, the inner end 28ae of the resin impregnated portion 28a formed in the frame shape over the entire periphery of the gas diffusion layer 20b of the anode 20 is spaced outward by the distance L3 from the overlapped portion 26 in the stacking direction. Further, as shown in FIG. 2, the area of the electrode catalyst layer 20a overlapped with the overlapped portion 26 faces the fuel gas flow field 42 provided for supplying the fuel gas along the anode 20.

Thus, the oxygen-containing gas is not retained in the overlapped portion 26 of the solid polymer electrolyte membrane 18. Therefore, the oxygen-containing gas is smoothly and reliably discharged from the gas diffusion layer 20b into the fuel gas flow field 42. Accordingly, it becomes possible to suppress degradation of the solid polymer electrolyte membrane 18 as much as possible without inducing reaction of the oxygen-containing gas and the fuel gas at the end of the solid polymer electrolyte membrane 18.

Figure 8:
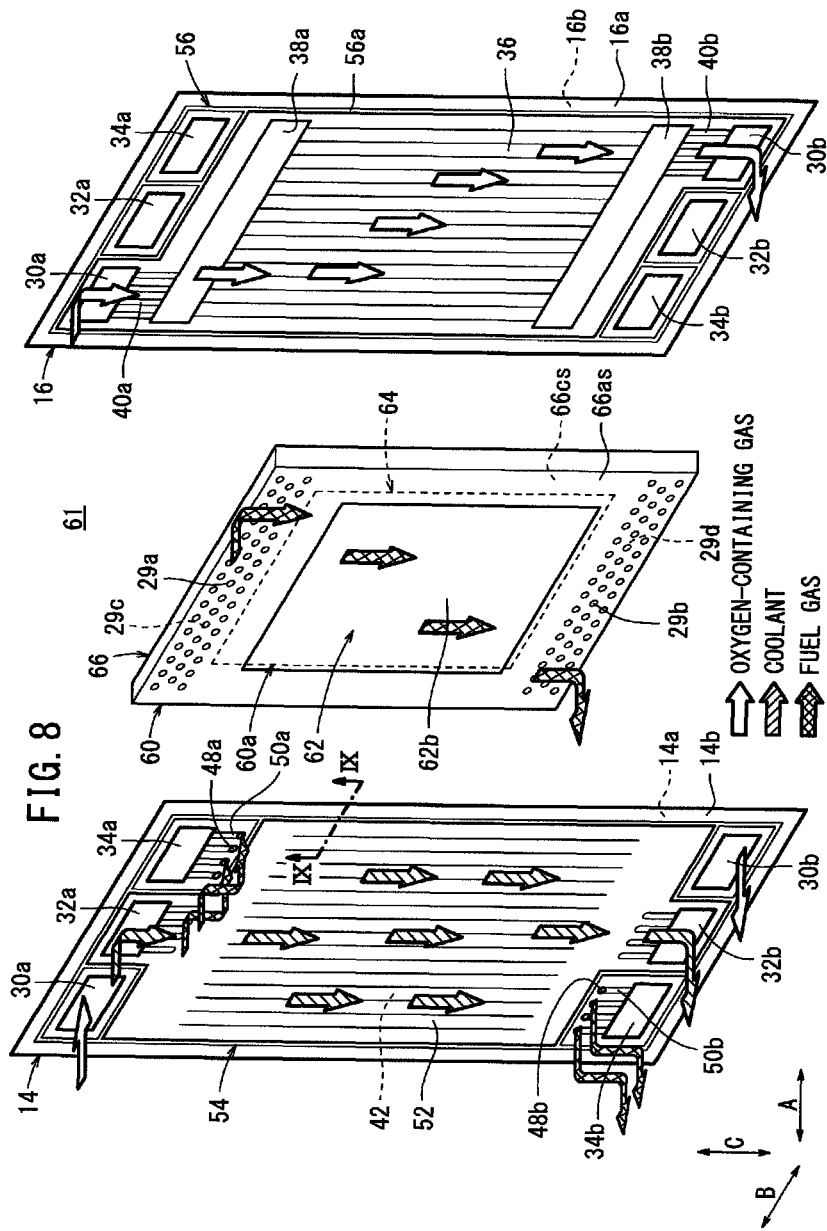
FIG. 8 is an exploded perspective view showing main components of a solid polymer fuel cell including a resin frame equipped membrane electrode assembly according to a second embodiment of the present invention.

FIG. 8 is an exploded perspective view showing main components of a solid polymer electrolyte fuel cell 62 including a resin frame equipped membrane electrode assembly 60 according to a second embodiment of the present invention. The constituent elements that are identical to those of the fuel cell 12 according to the first embodiment are labeled with the same reference numerals, and description thereof will be omitted. Further, also in third to fifth embodiments as described later, the constituent elements that are identical to those of the fuel cell 12 according to the first embodiment are labeled with the same reference numerals, and description thereof will be omitted.

Figure 9:
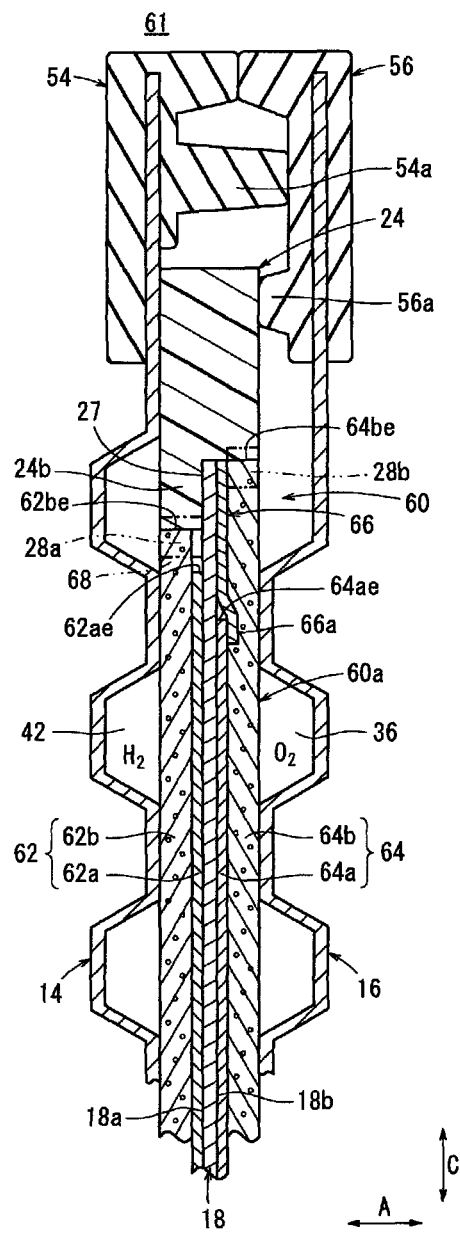
FIG. 9 is a cross sectional view showing the fuel cell, taken along a line IX-IX in FIG. 8.

As shown in FIGS. 8 and 9, the rectangular resin frame equipped membrane electrode assembly 60 includes a membrane electrode assembly 60a. The membrane electrode assembly 60a includes an anode 62, a cathode 64, and a solid polymer electrolyte membrane 18 interposed between the anode 62 and the cathode 64. The solid polymer electrolyte membrane 18 is formed by impregnating a thin membrane of perfluorosulfonic acid with water, for example. The surface size of the anode 62 is smaller than the surface size of the solid polymer electrolyte membrane 18 and the surface size of the cathode 64.

Figure 10:
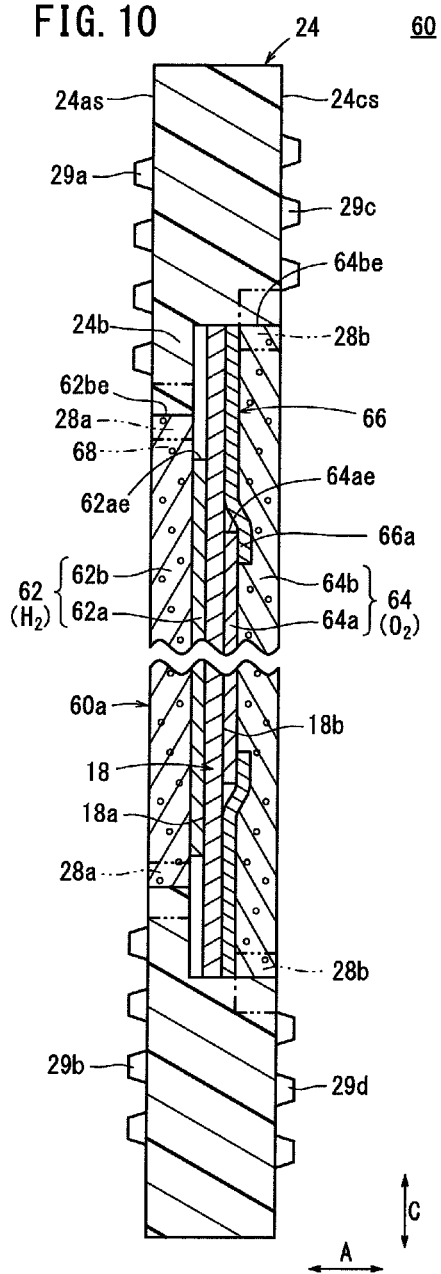
FIG. 10 is a cross sectional view showing main components of the resin frame equipped membrane electrode assembly.

The anode 62 includes an electrode catalyst layer (anode catalyst layer) 62a joined to one surface 18a of the solid polymer electrolyte membrane 18 and a gas diffusion layer (anode diffusion layer) 62b stacked on the electrode catalyst layer 62a. As shown in FIG. 10, an outer end 62be of the gas diffusion layer 62b protrudes outward beyond an outer end 62ae of the electrode catalyst layer 62a in the direction indicated by the arrow C, and the outer shape of the gas diffusion layer 62b is smaller than the outer shape of the solid polymer electrolyte membrane 18.

The cathode 64 includes an electrode catalyst layer (cathode catalyst layer) 64a joined to a surface 18b of the solid polymer electrolyte membrane 18 and a gas diffusion layer (cathode diffusion layer) 64b stacked on the electrode catalyst layer 64a. An outer end 64ae of the electrode catalyst layer 64a is spaced inward from the outer end 62ae of the electrode catalyst layer 62a in the direction indicated by the arrow C. The outer shape of an outer end 64be of the gas diffusion layer 64b is the same size as or smaller than the outer shape of the solid polymer electrolyte membrane 18. The surface size of the gas diffusion layer 64b is larger than the surface size of the gas diffusion layer 62b.

At the cathode 64, a frame shaped film member (reactant gas non-permeable area) 66 is provided between the surface 18b of the solid polymer electrolyte membrane 18 and the gas diffusion layer 64b. The frame shaped film member 66 has an overlapped portion 66a overlapped with the outer end 64ae of the electrode catalyst layer 64a. The film member 66 is made of material having low gas permeability in comparison with the solid polymer electrolyte membrane 18. For example, the film member is made of material such as PPS (Poly Phenylene Sulfide), PPA (polyphthalamide), PEN (polyethylene naphthalate), PES (polyethersulfone), LCP (liquid crystal polymer), PVDF (polyvinylidene fluoride), a silicone rubber, a fluororubber, or an EPDM (ethylene propylene diene monomer) rubber.

The resin frame member 24 includes a thin inner extension 24b protruding toward the outer periphery of the anode 62. The inner extension 24b contacts the outer end of the solid polymer electrolyte membrane 18. The thickness of the inner extension 24b is the same as the thickness of the anode 62. In effect, the thickness of the inner extension 24a is the same as the thickness of the gas diffusion layer 62b. The inner extension 24b of the resin frame member 24 is adhered to the outer end of the solid polymer electrolyte membrane 18 by the adhesive layer 27.

As shown in FIG. 9, an area of the gas diffusion layer 62b overlapped in the stacking direction faces the fuel gas flow field 42. That is, at the gas diffusion layer 62b, a reactant gas permeable area 68 is provided around the electrode catalyst layer 62a.

Next, a method of producing the resin frame equipped membrane electrode assembly 60 will be described below.

Figure 11:
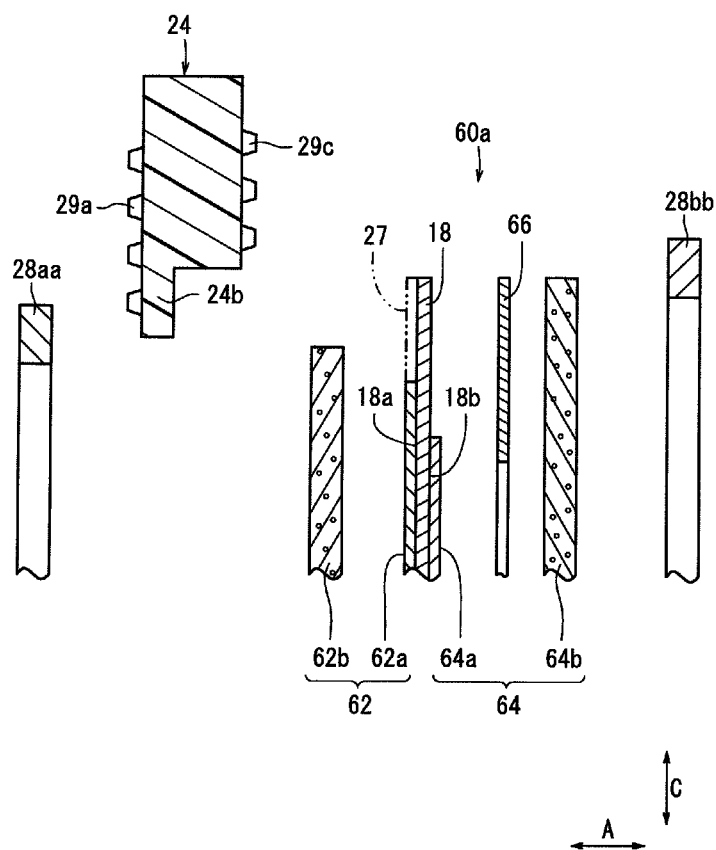
FIG. 11 is a cross sectional view showing a method of producing the resin frame equipped membrane electrode assembly.

Firstly, as shown in FIG. 11, the membrane electrode assembly 60a of a stepped-type MEA is fabricated. Specifically, coating of the electrode catalyst layers 62a, 64a is applied to both surfaces 18a, 18b of the solid polymer electrolyte membrane 18. The gas diffusion layer 62b is provided above the surface 18a of the solid polymer electrolyte membrane 18, i.e., on the electrode catalyst layer 62a, and the gas diffusion layer 64b is provided above the surface 18b of the solid polymer electrolyte membrane 18, i.e., on the electrode catalyst layer 64a such that the film member 66 is interposed between the electrode catalyst layer 64a and the gas diffusion layer 64b. These components stacked together, and are subjected to a hot pressing process to fabricate the membrane electrode assembly 60a.

The resin frame member 24 is formed by an injection molding machine (not shown) beforehand. The resin frame member 24 is formed in a frame shape, and the resin frame member 24 including the thin inner extension 24b is provided. A plurality of protrusions are formed on both surfaces of the resin frame member 24 and at both ends in the longitudinal direction to provide the inlet buffers 29a, 29c, and the outlet buffers 29b, 29d.

Then, in the membrane electrode assembly 60a, the adhesive layer 27 is provided at the outer end of the solid polymer electrolyte membrane 18 exposed to the outside from the outer periphery of the anode 62. Then, the resin frame member 24 is positionally aligned with the membrane electrode assembly 60a.

The inner extension 24b of the resin frame member 24 is provided at the anode 62, and the adhesive layer 27 is melted by heating (subjected to the hot melting process), and a load (e.g., pressure) is applied to the adhesive layer 27. Thus, the inner extension 24b is adhered to the solid polymer electrolyte membrane 18.

Further, at the anode 62, a resin member 28aa for forming the resin impregnated portion 28a is provided, and at the cathode 64, a resin member 28bb for forming the resin impregnated portion 28b is provided. Each of the resin members 28aa, 28bb has a frame shape, and is made of the same material as the resin frame member 24, for example. The resin impregnated portion 28a should be used as necessary. The resin impregnated portion 28a may not be provided.

In the state where the resin members 28aa, 28bb are provided in the membrane electrode assembly 60a and the resin frame member 24, and a load is applied to the resin members 28aa, 28bb, the resin members 28aa, 28bb are heated. As a heating method, for example, laser welding, infrared-ray welding, impulse welding or the like is adopted.

Thus, the resin members 28aa, 28bb are melted by heat, and the gas diffusion layers 62b of the anode 62 and the resin frame member 24 are impregnated with the melted resin of the resin member 28aa, 28bb. Further, the gas diffusion layer 64b of the cathode 64 and the resin frame member 24 are impregnated with the melted resin of the resin member 28bb. In this manner, the resin frame equipped membrane electrode assembly 60 is produced, as shown in FIG. 10.

The resin frame equipped membrane electrode assembly 60 is sandwiched between the first separator 14 and the second separator 16 to form the fuel cell 62. A predetermined number of the fuel cells 62 are stacked together to form a fuel cell stack, and a tightening load is applied to components between end plates (not shown)

In the second embodiment, as shown in FIGS. 9 and 10, at the cathode 64, the frame shaped film member 66 is provided between the solid polymer electrolyte membrane 18 and the gas diffusion layer 64b, and the frame shaped film member 66 has the overlapped portion 66a overlapped with the outer end 64ae of the electrode catalyst layer 64a.

In the structure, oxygen-containing gas which has permeated through the gas diffusion layer 64b from the cathode 64 does not contact the solid polymer electrolyte membrane 18. Accordingly, it becomes possible to suppress degradation of the solid polymer electrolyte membrane 18 as much as possible without inducing reaction of the oxygen-containing gas and the fuel gas at the end of the solid polymer electrolyte membrane 18.

Further, at the anode 62, the reactant gas permeable area (including the fuel gas flow field 42) 68 is provided around the electrode catalyst layer 62a. In the structure, the oxygen-containing gas which has permeated through the solid polymer electrolyte membrane 18 is not retained at the end of the solid polymer electrolyte membrane 18, and the oxygen-containing gas can be discharged from the gas diffusion layer 62b to the fuel gas flow field 42 smoothly and reliably.

Therefore, degradation at the end of the solid polymer electrolyte membrane 18 due to degradation by hydrogen peroxide produced by reaction of the oxygen-containing gas and the fuel gas or hydroxyl radical (.OH) produced using hydrogen peroxide as a precursor is effectively and reliably suppressed.

Figure 12:
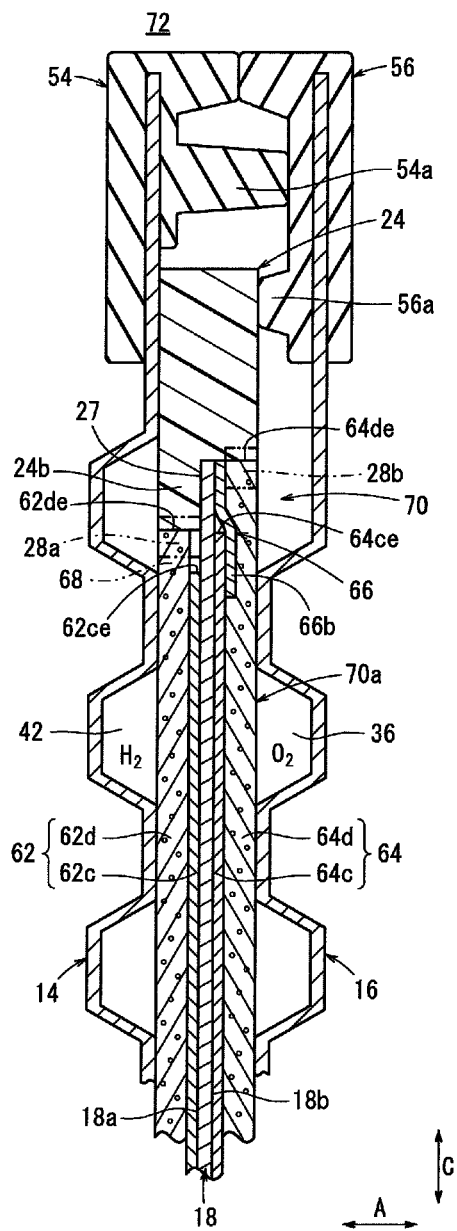
FIG. 12 is a cross sectional view showing a solid polymer fuel cell including a resin frame equipped membrane electrode assembly according to a third embodiment of the present invention.

FIG. 12 is a cross sectional view showing a solid polymer electrolyte fuel cell 72 including a resin frame equipped membrane electrode assembly 70 according to a third embodiment of the present invention.

The anode 62 of the resin frame equipped membrane electrode assembly 70 includes an electrode catalyst layer (anode catalyst layer) 62c joined to one surface 18a of the solid polymer electrolyte membrane 18 and the gas diffusion layer (anode diffusion layer) 62d stacked on the electrode catalyst layer 62c. An outer end 62de of the gas diffusion layer 62d protrudes outward beyond an outer end 62ce of the electrode catalyst layer 62c in the direction indicated by the arrow C, and the outer shape of the gas diffusion layer 62d is smaller than the outer shape of the solid polymer electrolyte membrane 18.

The cathode 64 includes an electrode catalyst layer (cathode catalyst layer) 64c joined to a surface 18b of the solid polymer electrolyte membrane 18 and a gas diffusion layer (cathode diffusion layer) 64d stacked on the electrode catalyst layer 64c. An outer end 64ce of the electrode catalyst layer 64c protrudes outward beyond the outer end 62ce of the electrode catalyst layer 62c in the direction indicated by the arrow C, and the outer shape of an outer end 64de of the gas diffusion layer 64d is the same as (or smaller than) the outer shape of the solid polymer electrolyte membrane 18.

At the cathode 64, a frame shaped film member 66 is provided between the solid polymer electrolyte membrane 18 and the gas diffusion layer 64d. The film member 66 has an overlapped portion 66b overlapped with the outer end 64ce of the electrode catalyst layer 64c. The overlapped portion 66b of the film member 66 is overlapped with the outer end 62ce of the electrode catalyst layer 62c of the anode 62 in the thickness direction indicated by the arrow A. At the gas diffusion layer 62d, a reactant gas permeable area 68 is provided around the electrode catalyst layer 62c.

In the third embodiment, the surface size of the electrode catalyst layer 62c of the anode 62 is smaller than the surface size of the electrode catalyst layer 64c of the cathode 64. This relationship is opposite to that of the second embodiment. Additionally, in the third embodiment, the film member 66 and the reactant gas permeable area 68 are provided, and the same advantages as in the case of the second embodiment are obtained.

Figure 13:
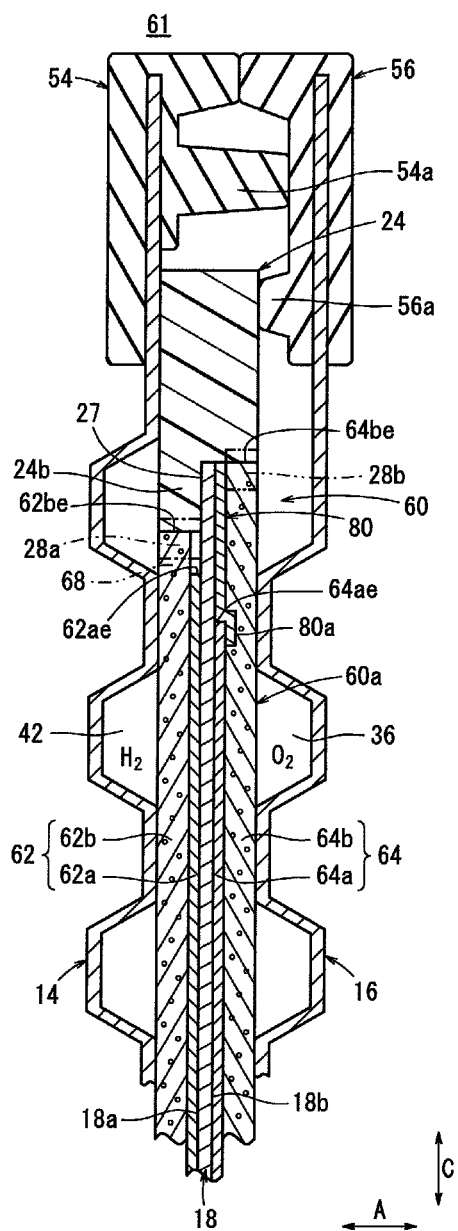
FIG. 13 is a view showing another reactant gas non-permeable area used instead of a film member.

FIG. 13 shows a reactant gas non-permeable area 80 used instead of the film member 66. The reactant gas non-permeable area 80 has an overlapped portion 80a overlapped with the outer end 64ae of the electrode catalyst layer 64a.

For example, in the reactant gas non-permeable area 80, the gas diffusion layer 64b is impregnated with the resin member, and the entire reactant gas non-permeable area 80 may adopt a flat surface. Alternatively, in the reactant gas non-permeable area 80, the outer end of the gas diffusion layer 64b may be pressed to increase the density, and in this state, the entire reactant gas non-permeable area 80 may adopt a flat surface.

In the structure, in the reactant gas non-permeable area 80, the same advantages as in the case of the film member 66 are obtained. Though the reactant gas non-permeable area 80 is adopted in the fuel cell 62 according to the second embodiment, the reactant gas non-permeable area 80 may be used in the fuel cell 72 according to the third embodiment.

Figure 14:
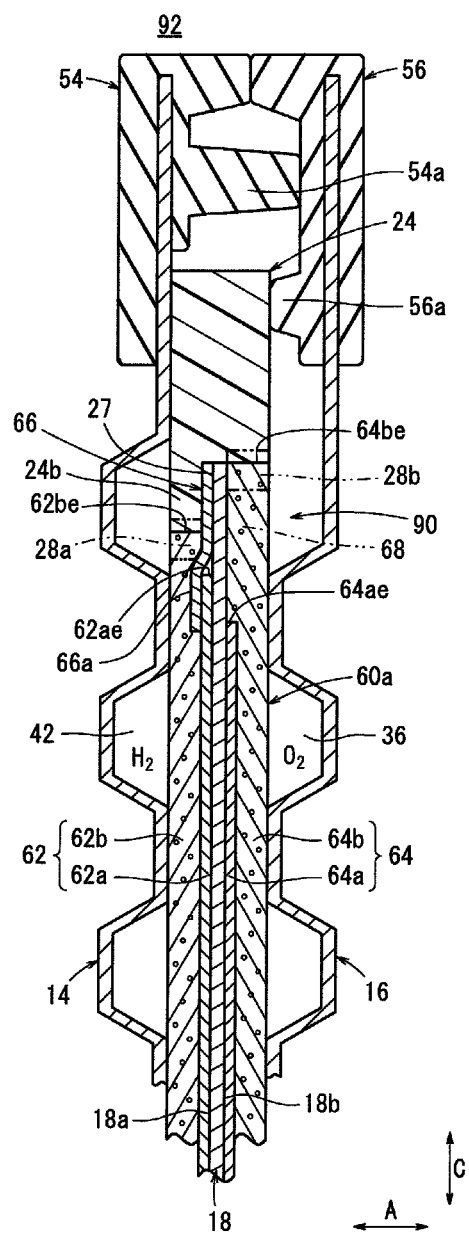
FIG. 14 is a cross sectional view showing a solid polymer electrolyte fuel cell including a resin frame equipped membrane electrode assembly according to a fourth embodiment of the present invention.

FIG. 14 is a cross sectional view showing a solid polymer electrolyte fuel cell 92 including a resin frame equipped membrane electrode assembly 90 according to a fourth embodiment of the present invention. Basically, the resin frame equipped membrane electrode assembly 90 according to the fourth embodiment has the same structure as the resin frame equipped membrane electrode assembly 60 according to the second embodiment.

In the resin frame equipped membrane electrode assembly 90, the outer end 62be of the gas diffusion layer 62b of the anode 62 protrudes outward beyond the outer end 62ae of the electrode catalyst layer 62a in the direction indicated by the arrow C, and the outer shape of the gas diffusion layer 62b is smaller than the outer shape of the solid polymer electrolyte membrane 18.

The outer end 64ae of the electrode catalyst layer 64a of the cathode 64 is spaced inward beyond the outer end 62ae of the electrode catalyst layer 62a in the direction indicated by the arrow C, and the outer shape of the outer end 64be of the gas diffusion layer 64b is the same as or smaller than the outer shape of the solid polymer electrolyte membrane 18. The surface size of the electrode catalyst layer 64a of the cathode 64 is smaller than the surface size of the electrode catalyst layer 62a of the anode 62.

At the anode 62, the frame shaped film member (reactant gas non-permeable area) 66 is provided between the surface 18a of the solid polymer electrolyte membrane 18 and the gas diffusion layer 62b. The frame shaped film member 66 has an overlapped portion 66a overlapped with the outer end 62ae of the electrode catalyst layer 62a. At the gas diffusion layer 64b, the reactant gas permeable area 68 facing the oxygen-containing gas flow field 36 is provided around the electrode catalyst layer 64a.

In the fourth embodiment, at the anode 62, the frame shaped film member 66 is provided between the surface 18a of the solid polymer electrolyte membrane 18 and the gas diffusion layer 62b. The frame shaped film member 66 has the overlapped portion 66a overlapped with the outer end 62ae of the electrode catalyst layer 62a.

In the structure, the fuel gas which has permeated through the gas diffusion layer 62b from the anode 62 does not contact the solid polymer electrolyte membrane 18. Accordingly, it becomes possible to suppress degradation of the solid polymer electrolyte membrane 18 as much as possible without inducing reaction of the oxygen-containing gas and the fuel gas at the end of the solid polymer electrolyte membrane 18.

Further, at the cathode 64, the reactant gas permeable area 68 is provided adjacent to the gas diffusion layer 64b. In the structure, the fuel gas which has permeated through the solid polymer electrolyte membrane 18 is not retained at the end of the solid polymer electrolyte membrane 18, and the fuel gas can be discharged from the gas diffusion layer 64b to the oxygen-containing gas flow field 36 smoothly and reliably.

Figure 15:
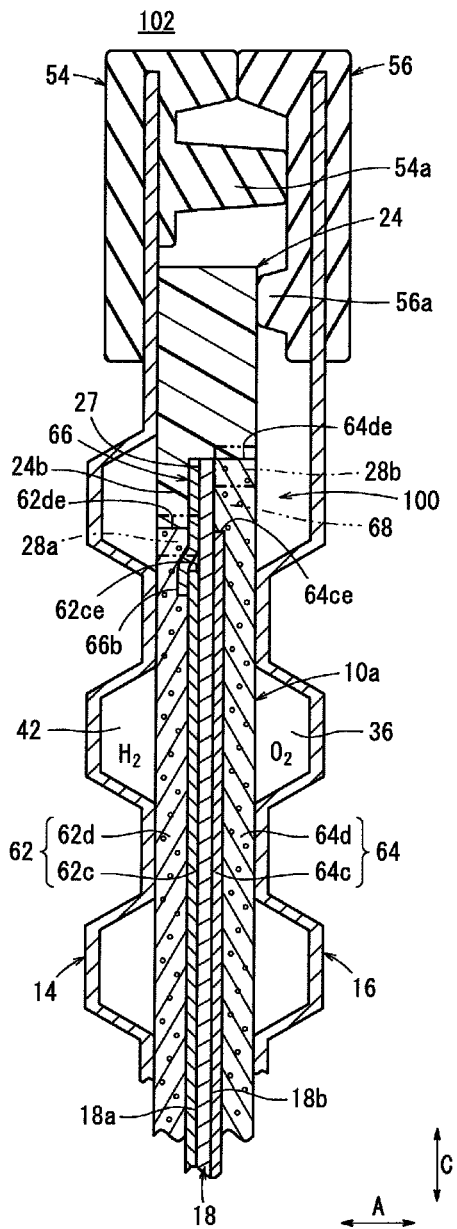
FIG. 15 is a cross sectional view showing a solid polymer electrolyte fuel cell including a resin frame equipped membrane electrode assembly according to a fifth embodiment of the present invention.
Figure 16:
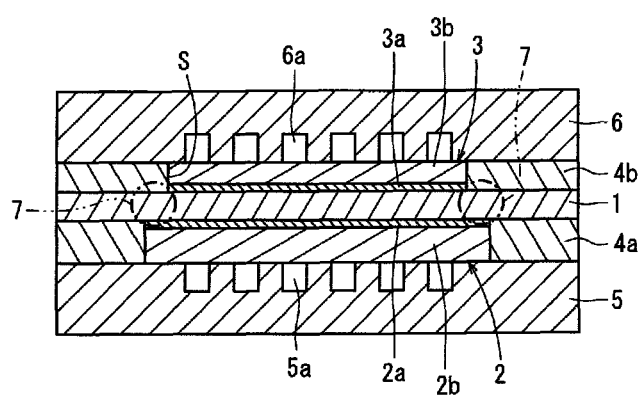
FIG. 16 is an explanatory view showing a solid polymer electrolyte fuel cell disclosed in conventional technique.

FIG. 15 is a cross sectional view showing a solid polymer electrolyte fuel cell 102 including a resin frame equipped membrane electrode assembly 100 according to a fifth embodiment of the present invention. Basically, the resin frame equipped membrane electrode assembly 100 according to the fifth embodiment has the same structure as the resin frame equipped membrane electrode assembly 70 according to the third embodiment.

In the resin frame equipped membrane electrode assembly 100, the outer end 62de of the gas diffusion layer 62d of the anode 62 protrudes outward beyond the outer end 62ce of the electrode catalyst layer 62c in the direction indicated by the arrow C, and the outer shape of the gas diffusion layer 62d is smaller than the outer shape of the solid polymer electrolyte membrane 18.

The outer end 64ce of the electrode catalyst layer 64c of the cathode 64 protrudes outward beyond the outer end 62ce of the electrode catalyst layer 62c in the direction indicated by the arrow C. The outer shape of the outer end 64de of the gas diffusion layer 64d is the same size as (or smaller than) the outer shape of the solid polymer electrolyte membrane 18.

At the anode 62, the frame shaped film member 66 is provided between the solid polymer electrolyte membrane 18 and the gas diffusion layer 62d. The frame shaped film member 66 has an overlapped portion 66b overlapped with the outer end 62ce of the electrode catalyst layer 62c.

In the fifth embodiment, the surface size of the electrode catalyst layer 62c of the anode 62 is smaller than the electrode catalyst layer 64c of the cathode 64. This relationship is opposite to that of the fourth embodiment. Additionally, in the fifth embodiment, the same advantages as in the case of fourth embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell membrane electrode assembly comprising:
a membrane electrode assembly including a solid polymer electrolyte membrane, an anode provided on one surface of the solid polymer electrolyte membrane, and a cathode provided on another surface of the solid polymer electrolyte membrane, the anode having an anode catalyst layer and an anode diffusion layer, the cathode having a cathode catalyst layer and a cathode diffusion layer, an outer end of the anode catalyst layer protruding outward beyond an outer end of the cathode catalyst layer; and
a resin frame member provided around the solid polymer electrolyte membrane, wherein:
the outer end of the cathode catalyst layer protrudes outward beyond an outer end of the cathode diffusion layer;
the resin frame member includes an inner extension protruding toward an outer periphery of the cathode to contact an outer end of the solid polymer electrolyte membrane; and
the inner extension has an overlapped portion overlapped with the outer end of the cathode catalyst layer.

2. The fuel cell membrane electrode assembly according to claim 1, wherein a resin impregnated portion formed integrally with the resin frame member is provided at the outer end of the anode diffusion layer; and an inner end of the resin impregnated portion is positioned outside the overlapped portion overlapped with the solid polymer electrolyte membrane in a stacking direction.

3. The fuel cell membrane electrode assembly according to claim 1, wherein an area of the anode catalyst layer overlapped with the overlapped portion in a stacking direction of the solid polymer electrolyte membrane faces the fuel gas flow field for supplying the fuel gas.

4. A fuel cell membrane electrode assembly including a solid polymer electrolyte membrane, an anode provided on one surface of the solid polymer electrolyte membrane, and a cathode provided on another surface of the solid polymer electrolyte membrane, the anode including an anode catalyst layer and an anode diffusion layer having a surface size larger than that of the anode catalyst layer, the cathode including a cathode catalyst layer and a cathode diffusion layer having a surface size larger than that of the cathode catalyst layer, the anode catalyst layer and the cathode catalyst layer having different surface sizes, wherein a frame shaped reactant gas non-permeable area is provided between the solid polymer electrolyte membrane and the cathode diffusion layer or the anode diffusion layer, and the frame shaped reactant gas non-permeable area has an overlapped portion overlapped with an outer end of the cathode catalyst layer or the anode catalyst layer; and a reactant gas permeable area is provided at the diffusion layer of the counter electrode opposite to the electrode where the non-permeable area is provided, around the catalyst layer of the counter electrode.

5. The fuel cell membrane electrode assembly according to claim 4, wherein an inner end of the frame shaped reactant gas non-permeable area has the overlapped portion which is overlapped with the outer end of the anode catalyst layer or the cathode catalyst layer in a thickness direction.

* * * * *